United States Patent
Choi et al.

(10) Patent No.: US 12,445,235 B2
(45) Date of Patent: Oct. 14, 2025

(54) ELECTRONIC DEVICE FOR UPDATING FRAME ERROR RATE OF LINK AND OPERATION METHOD OF ELECTRONIC DEVICE

(71) Applicant: SAMSUNG ELECTRONICS CO., LTD., Suwon-si (KR)

(72) Inventors: Junsu Choi, Suwon-si (KR); Changmok Yang, Suwon-si (KR); Chounjong Nam, Suwon-si (KR); Sungbin Min, Suwon-si (KR); Mincheol Jeong, Suwon-si (KR); Junyeop Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 84 days.

(21) Appl. No.: 18/437,158

(22) Filed: Feb. 8, 2024

(65) Prior Publication Data
US 2024/0178949 A1    May 30, 2024

Related U.S. Application Data

(63) Continuation of application No. PCT/KR2022/008082, filed on Jun. 8, 2022.

(30) Foreign Application Priority Data

Sep. 8, 2021    (KR) .................... 10-2021-0119768

(51) Int. Cl.
*H04L 1/18*    (2023.01)
*H04L 1/00*    (2006.01)
(Continued)

(52) U.S. Cl.
CPC ............ *H04L 1/203* (2013.01); *H04L 1/0013* (2013.01); *H04L 43/16* (2013.01)

(58) Field of Classification Search
CPC ... H04L 1/1685; H04L 1/1896; H04L 1/0013; H04L 1/203; H04L 43/16
See application file for complete search history.

(56) References Cited

U.S. PATENT DOCUMENTS 7,050,397 B2 *   5/2006   Cheng ................... H04L 1/1848
                                                          370/465
8,160,031 B2 *   4/2012   Willenegger ....... H04W 52/346
                                                          370/335
(Continued)

FOREIGN PATENT DOCUMENTS

JP          6747204 B2      8/2020
KR      10-2009-0114806 A   11/2009
(Continued)

OTHER PUBLICATIONS

Cariou, Laurent. "MLO-TID-link-mapping/link management: Default mode and link enablement". doc.: IEEE 802.11-18/0149r00. Jul. 1, 2020.

(Continued)

*Primary Examiner* — Esaw T Abraham
(74) *Attorney, Agent, or Firm* — Jefferson IP Law, LLP

(57) ABSTRACT

An embodiment of an electronic device according to the present disclosure may comprise: a communication circuit for transmitting or receiving data through a plurality of links; a memory for storing mapping data in which data rates and frame error rates for the plurality of links are mapped; and a processor operatively connected to the communication circuit and the memory, wherein the processor is configured to: in response to a request for transmitting a packet corresponding to a first type, identify a link, through which the number of packets less than a predesignated value have been transmitted or received, from among the plurality of links; transmit or receive a plurality of packets corresponding to a second type through the identified link; identify frame error (Continued)

rates for the plurality of packets corresponding to the second type; and update the mapping data on the basis of the identified frame error rates.

20 Claims, 7 Drawing Sheets

(51) Int. Cl.
*H04L 1/20* (2006.01)
*H04L 43/16* (2022.01)

(56) References Cited

U.S. PATENT DOCUMENTS

| | | | |
|---|---|---|---|
| 8,254,977 B2* | 8/2012 | Fernandez-Corbaton | .................. H04W 52/343 455/517 |
| 8,442,016 B1* | 5/2013 | Lee | ................... H04W 72/1215 455/41.2 |
| 8,644,263 B2* | 2/2014 | Cheng | ................. H04W 52/262 370/335 |
| 9,325,513 B2* | 4/2016 | Liu | ..................... H04L 41/5022 |
| 9,516,685 B2 | 12/2016 | Lei et al. | |
| 10,164,692 B2 | 12/2018 | Jung et al. | |
| 10,425,960 B2 | 9/2019 | Bai et al. | |
| 11,115,871 B2 | 9/2021 | Xu et al. | |
| 11,252,784 B2 | 2/2022 | Park et al. | |
| 2009/0274131 A1 | 11/2009 | Lee et al. | |
| 2018/0248657 A1 | 8/2018 | Dayanandan et al. | |
| 2019/0150176 A1 | 5/2019 | Pelletier et al. | |
| 2021/0014811 A1 | 1/2021 | Seok et al. | |
| 2022/0167444 A1 | 5/2022 | Jang et al. | |
| 2022/0346176 A1 | 10/2022 | Jang et al. | |

FOREIGN PATENT DOCUMENTS

| | | |
|---|---|---|
| KR | 10-1506598 B1 | 3/2015 |
| KR | 10-2016-0118070 A | 10/2016 |
| KR | 10-2020-0059768 A | 5/2020 |
| KR | 10-2021-0080897 A | 7/2021 |
| WO | 2021/002618 A1 | 1/2021 |
| WO | 2021/049817 A1 | 3/2021 |

OTHER PUBLICATIONS

Patil, Abhishek et al. "MLO: TID-to-link negotiation". doc.: IEEE 802.11-20/1044r2. Nov. 1, 2020.

* cited by examiner

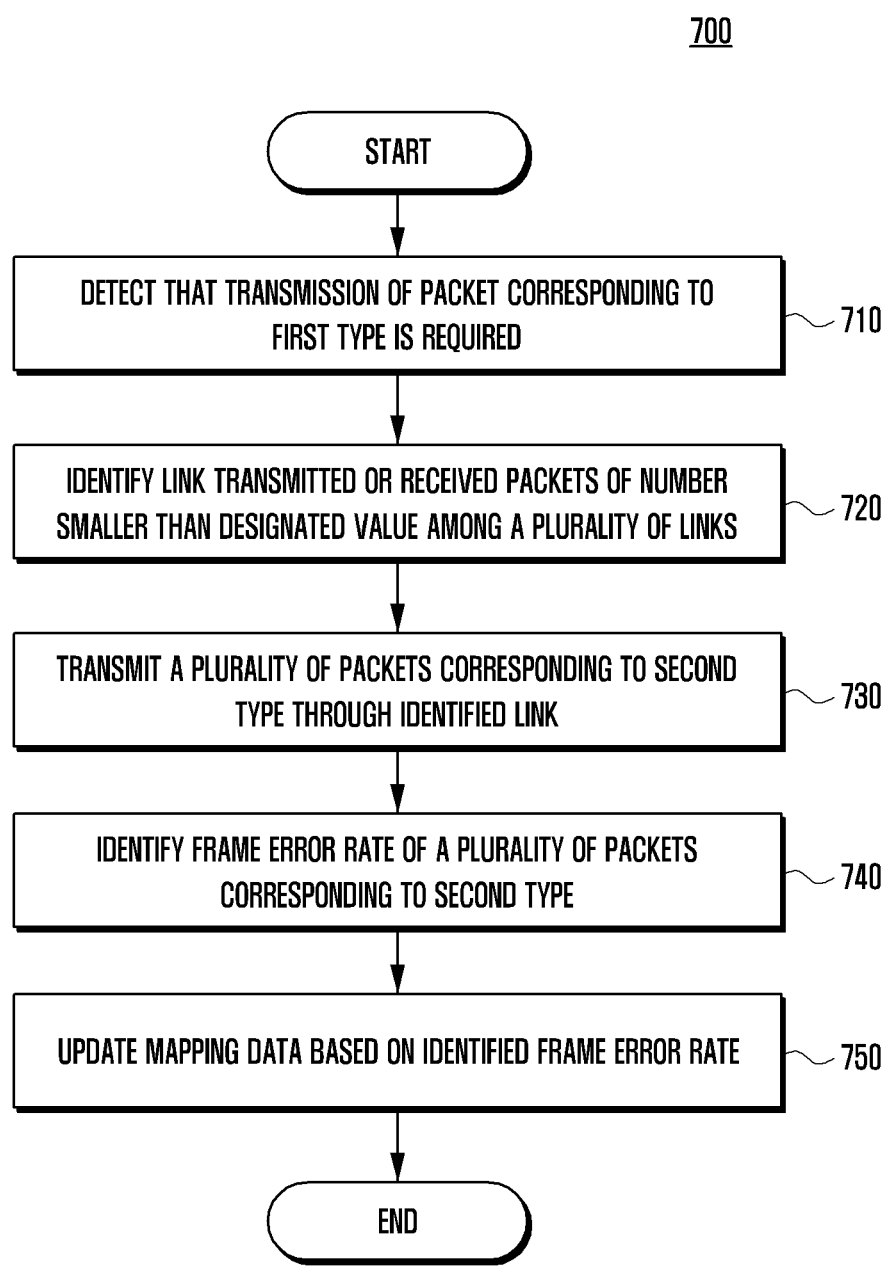

ELECTRONIC DEVICE FOR UPDATING FRAME ERROR RATE OF LINK AND OPERATION METHOD OF ELECTRONIC DEVICE

CROSS-REFERENCE TO RELATED APPLICATIONS

This application is a continuation application of International Application No. PCT/KR2022/008082 filed on Jun. 8, 2022, which claims priority from and derives the benefit of Korean Patent Application No. 10-2021-0119768 filed on Sep. 8, 2021, each of these applications is hereby incorporated in its entirety, by reference.

TECHNICAL FIELD

Various embodiments of the disclosure relate to electronic devices and methods of operating the same, and to techniques for updating a frame error rate of a specific link.

BACKGROUND ART

With the spread of various electronic devices, improvements in the speed of wireless communication which various electronic devices may use have been implemented. Among wireless communications supported by recent electronic devices, IEE 802.11 WLAN (or Wi-Fi) is a standard for implementing high-speed wireless connections on various electronic devices. The first implemented Wi-Fi could support transmission rates of maximum 1 to 9 Mbps, but Wi-Fi 6 technology (or IEEE 802.11 ax) can support transmission rates of maximum about 10 Gbps.

Electronic devices may support various services (e.g., UHD quality video streaming service, augmented reality (AR) service, virtual reality (VR) service, and/or mixed reality (MR) services) using relatively large capacity data through wireless communication supporting high transmission rates, and support various other services.

The IEEE 802.11 WLAN standard plans to introduce technology that supports a multi-link operation (MLO) in order to improve the speed of data transmission and reception and reduce a delay time. Electronic devices that support a multi-link operation are able to transmit or receive data through a plurality of links, thereby being expected to implement a relatively high transmission rate and low delay time.

In order for an electronic device to transmit or receive data through wireless communication, at least one link may be generated between the electronic device and an external electronic device, and an appropriate modulation method and/or data rate may be determined according to a state of the link. The electronic device may change a modulation method and/or data rate according to changes in the state of the link. When using a service through short-range wireless communication, the electronic device may implement an appropriate data transmission success rate and/or data transmission rate.

The electronic device may determine or change (rate adaption) a modulation level and/or a data rate based on an environment of a channel used for transmitting data. The electronic device may determine a modulation level and/or a channel coding rate using a frame error rate (FER) sampling method. The electronic device may measure a frame error rate (FER), which is a ratio of the size of data attempted to transmit and the size of data in which transmission is failed and calculate a data transmission success rate according to each modulation level and data rate based on the measured FER. The electronic device may perform data transmission using a modulation level and data rate with the highest data transmission success rate.

SUMMARY

An electronic device may not transmit and/or receive packets through a specific link during a specific time due to various reasons. During a specific time, a state of a specific link may change. In the case that the electronic device transmits or receives a packet through the specific link in a situation in which the state of the specific link is changed, the electronic device may select a modulation level and/or data rate of the packet based on previous FER information. In this case, the modulation level and/or data rate selected by the electronic device may not reflect a changed state of a specific link. Because FER information does not reflect a changed state of a specific link, reliability of FER information may become low.

In the case that FER information with low reliability is used, a transmission rate of packets transmitted by the electronic device may decrease, and as packet transmission may fail, a delay time for packet retransmission may increase.

According to various embodiments of the disclosure, an electronic device may include a communication circuit configured to transmit or receive data through a plurality of links generated between an external electronic device and the electronic device; a memory configured to store mapping data in which a data rate and frame error rate for the plurality of links are mapped; and a processor operatively connected to the communication circuit and the memory, wherein the processor may be configured to identify a link transmitted or received packets of the number smaller than a designated value among a plurality of links corresponding to a request for transmission of packets corresponding to a first type, to transmit or receive a plurality of packets corresponding to a second type through the identified link, to identify a frame error rate for a plurality of packets corresponding to the second type, and to update the mapping data based on the identified frame error rate.

According to various embodiments of the disclosure, a method of operating an electronic device may include identifying a link transmitted or received packets of the number smaller than a designated value among a plurality of links generated between the electronic device and an external electronic device corresponding to a request for transmission of packets corresponding to a first type; transmitting or receiving a plurality of packets corresponding to a second type to or from the external electronic device through the identified link; identifying a frame error rate for a plurality of packets corresponding to the second type; and updating the mapping data based on the identified frame error rate.

An electronic device and a method of operating the electronic device according to various embodiments of the disclosure can transmit packets related to a service that may be implemented even at a relatively low transmission rate and/or high delay time through a link transmitted or received packets of the number smaller than a designated value among a plurality of links. The electronic device can identify a frame error rate of the link as it transmits or receives packets, and update mapping data in which a data rate and frame error rate are mapped based on the identified frame error rate. Accordingly, the electronic device and a method of operating the electronic device can determine a modulation level and/or data rate of the packet based on the updated

BRIEF DESCRIPTION OF DRAWINGS

FIG. 7 is a flowchart illustrating an operation of a method of operating an electronic device according to various embodiments of the disclosure.

DETAILED DESCRIPTION

Figure 1:
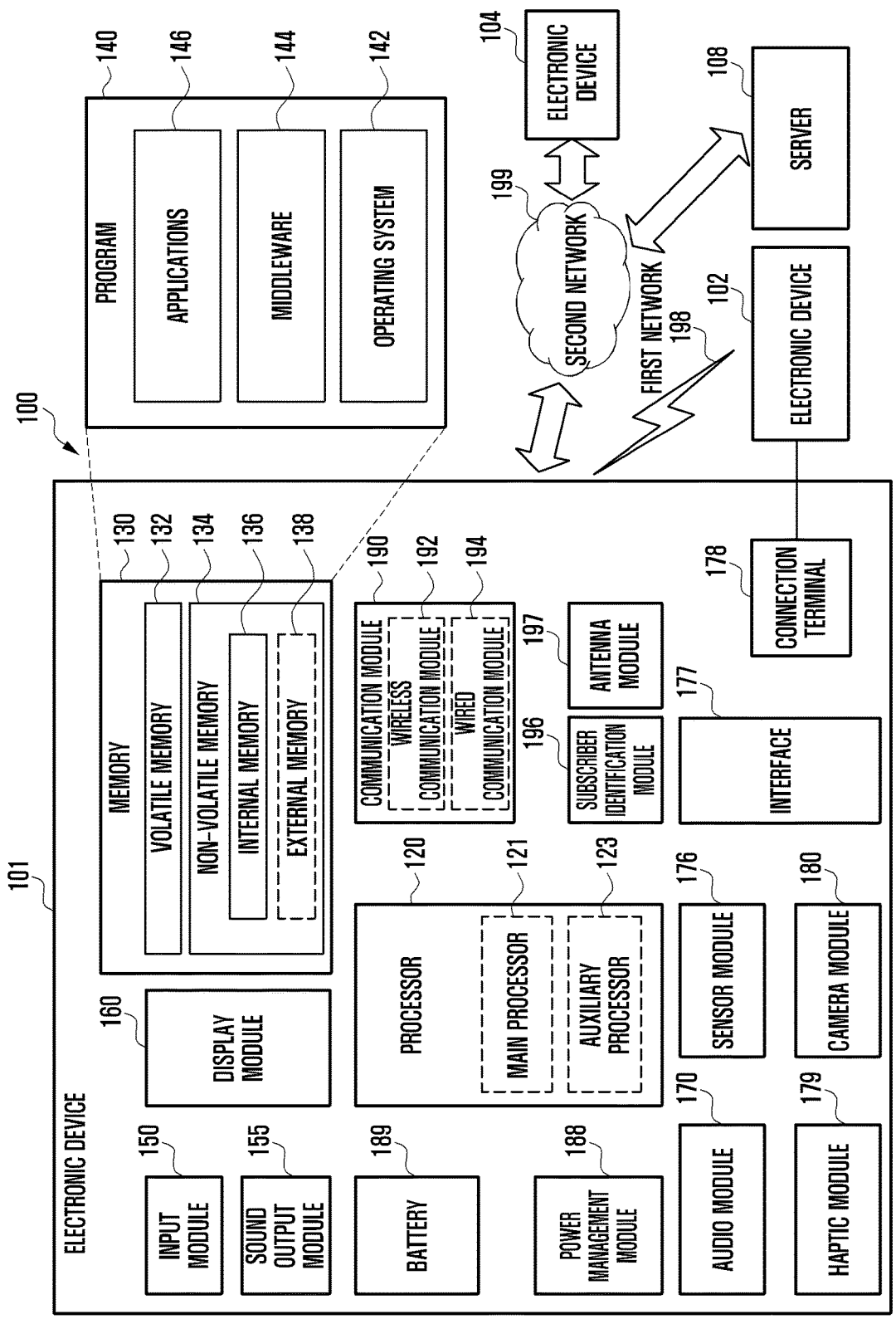
FIG. 1 is a block diagram illustrating an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
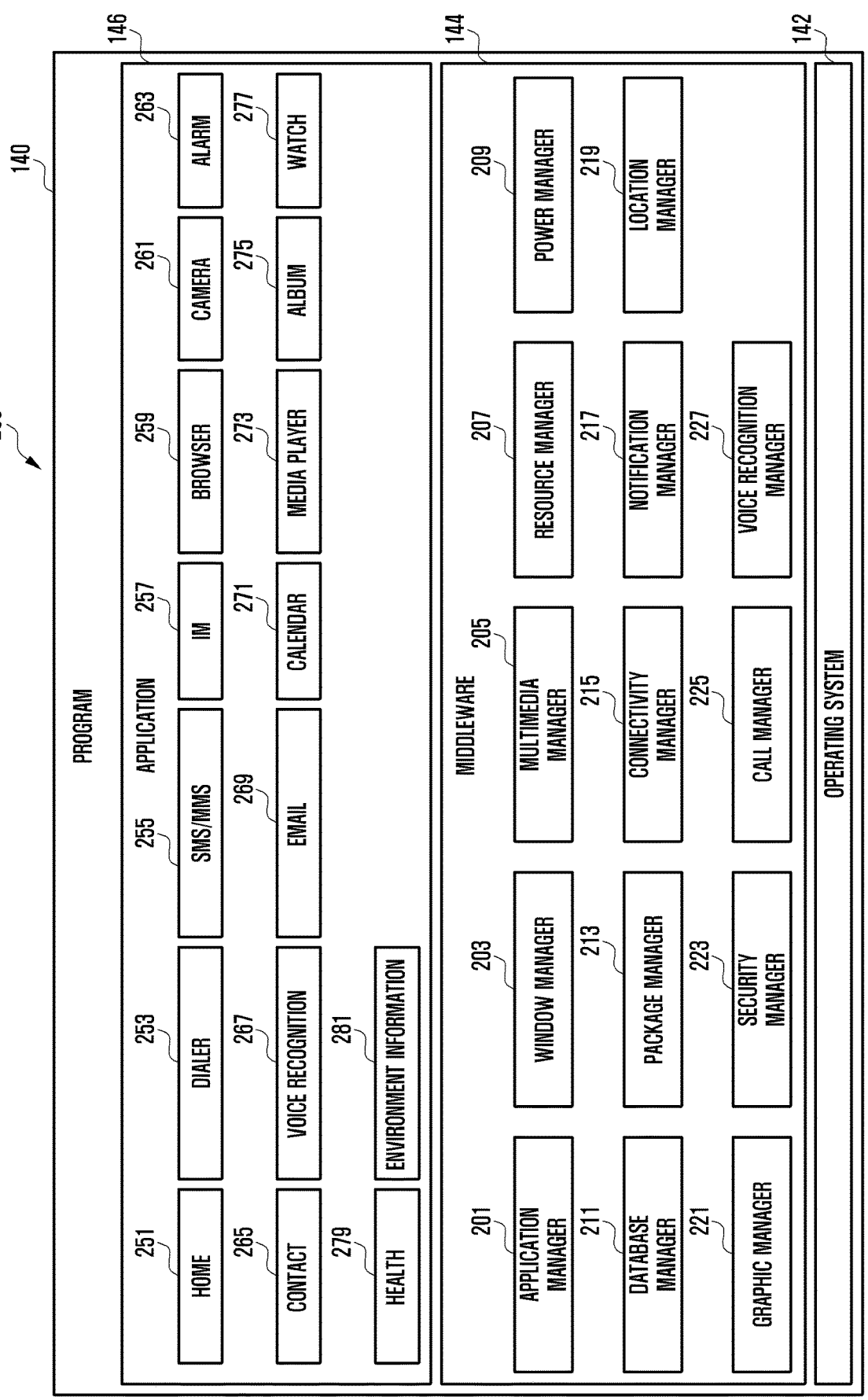
FIG. 2 is a block diagram illustrating a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
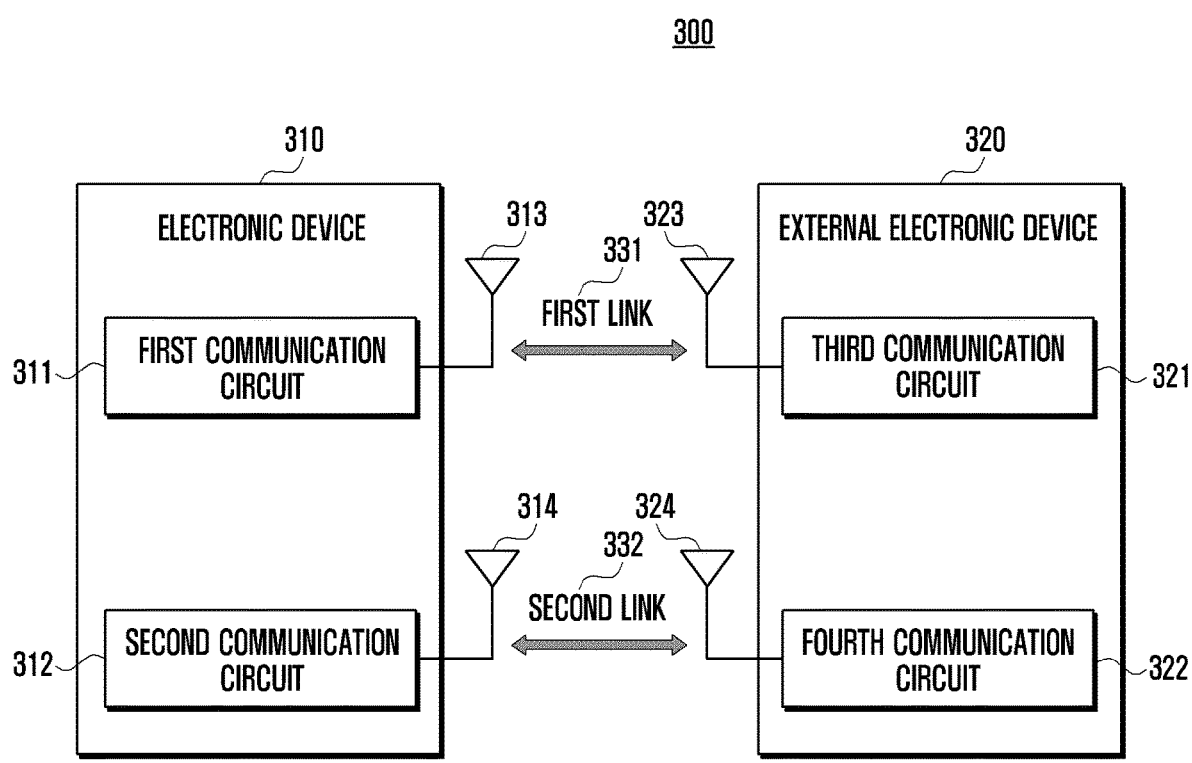
FIG. 3 is a diagram illustrating an embodiment in which an electronic device and an access point (AP) operate in a multi-link operation (MLO) according to various embodiments of the disclosure.

FIG. 3 is a diagram illustrating an embodiment in which an electronic device and an access point (AP) operate in a multi-link operation (MLO) according to various embodiments of the disclosure.

With reference to FIG. 3, a wireless LAN system 300 may include an electronic device 310 and/or an external electronic device 320. According to an embodiment, the electronic device 310 may perform wireless communication with the external electronic device 320 through short-range wireless communication. Wireless communication may mean various communication methods that both the electronic device 310 and/or the external electronic device 320 may support. For example, wireless communication may be Wi-Fi. The external electronic device 320 may function as a base station that provides wireless communication to at least one electronic device 310 positioned inside a communication radius of the wireless LAN system 300. For example, the external electronic device 320 may include an access point (AP) of IEEE 802.11. The electronic device 310 may include a station (STA) of IEEE 802.11.

According to various embodiments of the disclosure, the electronic device 310 and/or the external electronic device 320 may support a multi-link operation (MLO). The multi-link operation may be an operation mode that transmits or receives data through a plurality of links (e.g., a first link 331 and a second link 332). The multi-link operation is an operation mode scheduled to be introduced in IEEE 802.11be and may be an operation mode that transmits or receives data through a plurality of links based on a plurality of bands or channels.

According to various embodiments of the disclosure, in order to support a multi-link operation, the electronic device 310 may include a plurality of communication circuits (e.g., a first communication circuit 311 and/or a second communication circuit 312). The first communication circuit 311 may transmit data to the external electronic device 320 through the first link 331 or receive data transmitted by the external electronic device 320 through the first link 331. The first communication circuit 311 may output or receive a signal in the frequency band corresponding to the first link 331 through the first antenna 313. The second communication circuit 312 may transmit data to the external electronic device 320 through the second link 332 or receive data transmitted by the external electronic device 320 through the second link 332. The second communication circuit 312 may output or receive a signal in the frequency band corresponding to the second link 332 through a second antenna 314.

According to various embodiments of the disclosure, in order to support a multi-link operation, the external electronic device 320 may include a plurality of communication circuits (e.g., a third communication circuit 321 and/or a fourth communication circuit 322). The third communication circuit 321 may transmit data to the electronic device 310 through the first link 331 or receive data transmitted by the electronic device 310 through the first link 331. The third communication circuit 321 may output or receive a signal in the frequency band corresponding to the first link 331 through a third antenna 323. The fourth communication circuit 322 may transmit data to the electronic device 310 through the second link 332 or receive data transmitted by the electronic device 310 through the second link 332. The fourth communication circuit 322 may output or receive a signal in the frequency band corresponding to the second link 332 through a fourth antenna 324.

According to various embodiments of the disclosure, a frequency band of the first link 331 and a frequency band of the second link 333 may be different from each other. For example, a frequency band of the first link 331 may be 2.5 GHZ, and a frequency band of the second link 332 may be 5 GHz or 6 GHz.

According to various embodiments of the disclosure, the first link 331 and the second link 332 may use electronic devices other than the electronic device 310. In order to prevent a situation in which the electronic device 310 and another electronic device simultaneously transmit or receive data through the same link, the electronic device 310 may support a carrier sense multiple access with collision avoidance (CSMA/CA) method. The CSMA/CA method may be a method of performing data transmission when a specific link is in an idle state. The electronic device 310 supporting CSMA/CA may identify whether another electronic device is transmitting data through a specific link, and in the case that the electronic device 310 detects data transmission, the electronic device 310 may not transmit data through the specific link but stand by. The electronic device 310 supporting CSMA/CA may transmit data through a specific link according to a designated method (e.g., activating a timer and transmitting data when the timer expires) corresponding to identifying that no other electronic device is transmitting data through a specific link. Through the above method, the electronic device 310 may transmit and/or receive data using a specific link without colliding with other electronic devices.

According to various embodiments of the disclosure, the first link 331 and/or the second link 332 supported by a multi-link operation may independently support CSMA/CA.

The electronic device 310 supporting the CSMA/CA method may identify whether a specific link is in an idle state before transmitting data. The electronic device 310 may transmit data through a specific link in an idle state.

The electronic device 310 may identify whether the first link 331 is in an idle state based on information related to the idle state of the first link 331 included in data transmitted by the external electronic device 320. Information related to the idle state of the first link 331 may include a clear channel assessment (CCA) status field and/or a network allocation vector (NAV) configuration field. Information related to the idle state of the first link 331 may be included in a ready to send (RTS) message requesting data transmission through the first link 331 and a clear to send (CTS) message indicating that data transmission through the first link 331 is possible. The electronic device 310 may identify whether a specific link is in an idle state with reference to the clear channel assessment (CCA) status field and/or the network allocation vector (NAV) configuration field. The electronic device 310 may determine whether the first link 331 is in a physically idle state with reference to the CCA status field, and determine whether the first link 331 is in a logically idle state with reference to the NAV configuration field. The electronic device 310 may activate a timer corresponding to identifying that the first link 331 is in an idle state, and transmit data to the external electronic device 320 through the first link 331 corresponding to the timer expiring after a designated time.

The electronic device 310 may identify whether the second link 332 is in an idle state based on information related to the idle state of the second link 332 included in data transmitted by the external electronic device 320. Information related to the idle state of the second link 332 may include a clear channel assessment (CCA) status field and/or a network allocation vector (NAV) configuration field. Information related to the idle state of the second link 332 may be included in a ready to send (RTS) message requesting data transmission through the second link 332, and a clear to send (CTS) message indicating that data transmission through the second link 332 is possible. The electronic device 310 may identify whether a specific link is in an idle state with reference to the clear channel assessment (CCA) status field and/or the network allocation vector (NAV) configuration field. The electronic device 310 may determine whether the second link 332 is in a physically idle state with reference to the CCA status field, and determine whether the second link 332 is in a logically idle state with reference to the NAV configuration field. The electronic device 310 may activate a timer corresponding to identifying that a specific link is in an idle state, and transmit data to the external electronic device 320 through the second link 332 corresponding to the timer expiring after a designated time.

Figure 4:
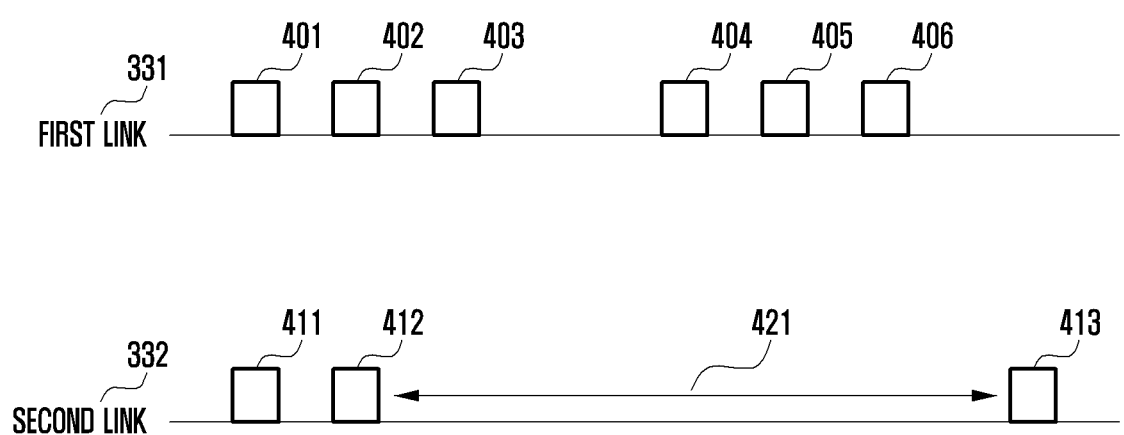
FIG. 4 is a diagram illustrating an embodiment in which an electronic device transmits or receives packets through a first link and/or a second link according to various embodiments of the disclosure.

FIG. 4 is a diagram illustrating an embodiment in which an electronic device transmits or receives packets through a first link and/or a second link according to various embodiments of the disclosure.

The electronic device 310 may transmit or receive packets to or from an external electronic device (e.g., the external electronic device 320 of FIG. 3) through a plurality of links including a first link (e.g., the first link 331 of FIG. 3) and/or a second link (e.g., the second link 332 of FIG. 3).

The electronic device 310 may transmit or receive a plurality of packets 401, 402, 403, 404, 405, and 406 to or from the external electronic device 320 through the first link 331. The electronic device 310 may determine an appropriate modulation method and/or data rate based on the state of the first link 331 before transmitting the plurality of packets 401, 402, 403, 404, 405, and 406. The electronic device 310 may support rate adaptation that determines or changes the modulation level and/or data rate based on the environment of the first link 331.

The electronic device 310 may determine (or change) a data rate and/or modulation level of packets 401, 402, 403, 404, 405, and 406 to be transmitted or received through the first link 331 based on a FER sampling method. The FER sampling method may mean a method of transmitting sampling packets generated based on various data rates to the external electronic device 320 and identifying a ratio of packets failed to transmit (or packets failed to receive a response message) among the transmitted sampling packets. The electronic device 310 may generate mapping data as illustrated in Table 1 through the FER sampling method.

TABLE 1

| Data rate | FER | Expected effective throughput |
|---|---|---|
| $r_1$ | $FER_1$ | $r_1*(1-FER_1)$ |
| $r_2$ | $FER_2$ | $r_2*(1-FER_2)$ |
| $r_3$ | $FER_3$ | $r_3*(1-FER_3)$ |

The electronic device 310 may select a data rate of a packet to be transmitted to the external electronic device 320 based on mapping data. According to an embodiment, the electronic device 310 may select a data rate corresponding to the highest expected effective throughput value, perform channel coding of a plurality of packets 401, 402, 403, 404, 405, and 406 based on the selected data rate, and transmit encoded packets to the external electronic device 320 through the first link 331.

The electronic device 310 may transmit or receive a plurality of packets 411, 412, and 413 to or from the external electronic device 320 through the second link 332. The electronic device 310 may determine an appropriate modulation method and/or data rate based on the state of the second link 332 before transmitting the plurality of packets 411, 412, and 413. The electronic device 310 may support rate adaptation that determines or changes the modulation level and/or data rate based on the environment of the second link 332.

The electronic device 310 may determine (or change) a data rate and/or modulation level of the packets 411, 412, and 413 to be transmitted or received through the second link 332 based on the FER sampling method. The electronic device 310 may generate mapping data to be used for packet transmission through the second link 332 independently of the first link 331.

The electronic device 310 may select a data rate of the packet to be transmitted to the external electronic device 320 based on mapping data. According to an embodiment, the electronic device 310 may select a data rate corresponding to the highest expected data throughput value, perform channel coding of a plurality of packets 411, 412, and 413 based on the selected data rate, and transmit encoded packets to the external electronic device 320 through the second link 332.

The electronic device 310 may not transmit and/or receive data through the second link 332 during a specific time 421 due to various reasons. For example, in a situation in which another external electronic device transmits or receives data through the second link 332, the electronic device 310 may identify that the second link 332 is not in an idle state, and transmit packets 404, 405, and 406 through the first link 331. During a specific time 421, the state of the second link 332 may be changed, and in the case that the state of the second link 332 is changed, there may occur a phenomenon that reliability of FER information on the second link 332 decreases.

For example, in a situation in which the electronic device 310 transmits a packet 413 through the second link 332, a propagation environment of the second link 332 may change during the specific time 421. FER information included in mapping data used for determining a data rate of the packet 413 is information generated before the specific time 421, and may be inaccurate when used for processing packets after the specific time 421. The electronic device 310 may perform channel coding of the packet 413 using the data rate determined through inaccurate FER information. In this case, as the transmission rate of the packet 413 decreases and transmission of the packet 413 fails, a delay time for retransmission of the packet 413 may increase.

Hereinafter, an embodiment of generating mapping data including reliable FER information and transmitting packets based on the mapping data will be described.

Figure 5:
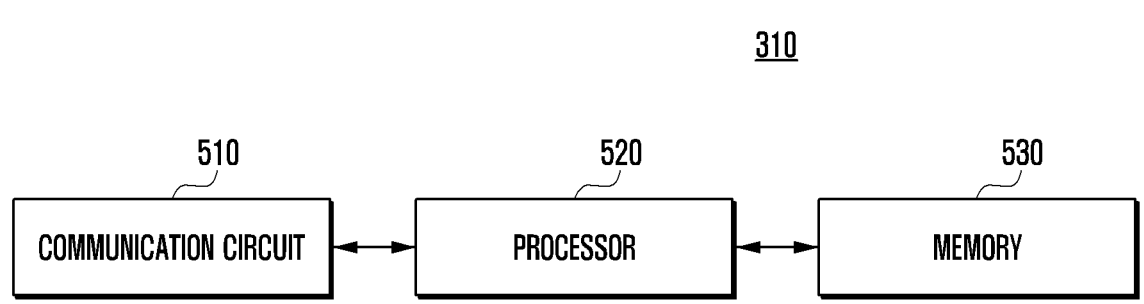
FIG. 5 is a block diagram illustrating an electronic device according to various embodiments of the disclosure.

FIG. 5 is a block diagram illustrating an electronic device according to various embodiments of the disclosure.

According to various embodiments of the disclosure, an electronic device (e.g., the electronic device 310 of FIG. 3) may include a communication circuit 510 (e.g., the first communication circuit 311 or the second communication circuit 312 of FIG. 4B), a processor 520 (e.g., the processor 120 of FIG. 1), and/or a memory 530 (e.g., the memory 130 of FIG. 1).

The communication circuit 510 may include various circuit structures used for modulating and/or demodulating signals within the electronic device 310. For example, the communication circuit 510 may modulate a baseband signal into a radio frequency (RF) band signal to output through an antenna (not illustrated) or demodulate an RF band signal received through the antenna into a baseband signal to transmit the signal to the processor 520.

The communication circuit 510 may transmit a plurality of packets to an external electronic device (e.g., the external electronic device 320 of FIG. 3) through a first link (e.g., the first link 331 of FIG. 3) or receive data transmitted by the external electronic device 320 through the first link 331. The communication circuit 510 may transmit a packet to the external electronic device 320 through a second link (e.g., the second link 332 of FIG. 3) or receive a packet transmitted by the external electronic device 320 through the second link 332. The communication circuit 510 may output or receive a signal in the frequency band corresponding to the first link 331 through an antenna (not illustrated) and output or receive a signal in the frequency band corresponding to the second link 332 through the antenna (not illustrated).

The processor 520 may perform an operation of receiving data transmitted by an application processor (e.g., the processor 120 of FIG. 1) and generating a packet for transmitting the received data to the external electronic device 320. The processor 520 may be defined as a communication processor (or communication processor) included in a communication module (e.g., the wireless communication module 192 of FIG. 1). According to an embodiment, the processor 520 may generate a packet by performing channel coding based on data transmitted by an application processor (e.g., the application processor 120 of FIG. 1) or identify whether an error occurs in at least part of data transmitted by the external electronic device 320, and in the case that an error occurs in at least part of data transmitted by the external electronic device 320, the processor 520 may perform an error recovery operation (e.g., hybrid auto repeat request (HARQ)).

The processor 520 may be operatively connected to the communication circuit 510 and control an operation of the communication circuit 510. The processor 520 may receive data transmitted by the application processor 120 and select a channel to be used for transmitting or receiving packets corresponding to the data based on characteristics of a service included in the data.

The characteristics of the service may mean a service type (TID) defined in IEEE 802.11. According to an embodiment, the characteristics of the service may include a first type (e.g., voice data type (AC_VO), video data type (AC_VI)) requiring a relatively high transmission rate or low delay rate (e.g., real-time) and/or a second type (e.g., background (AC_BK) and/or best effort (AC_BE)), which is a service type that may be performed at a relatively low transmission rate or high delay rate compared to the first type.

When selecting a channel, the processor 520 may refer to link mapping data in which service characteristics and channel identification information are mapped. Link mapping data may be stored in the memory 530. Link mapping data may be implemented, as illustrated in Table 2.

TABLE 2

| Service Type | Available Links |
|---|---|
| First type (e.g., AC_VO, AC_VI) | First link, Second link |
| Second type (e.g., AC_BE, AC_BK) | First link |

The processor 520 may identify a service type of data in a manner of identifying data transmitted by the application processor 120 and select a link in which a packet corresponding to data will be transmitted based on the identified service type and link mapping data. For example, the processor 520 may select the first link 331 and the second link 332 as a link to use for transmitting a packet corresponding to data of the first type based on identifying that a service type of data is a first type. For example, the processor 520 may select the first link 331 as a link to be used for transmitting a packet corresponding to data of the second type corresponding to identifying that a service type of data is a second type.

In order to transmit data through the first link 331, the processor 520 may identify whether the first link 331 is in an idle state. The processor 520 may identify whether the first link 331 is in an idle state with reference to a clear channel assessment (CCA) status field and/or a network allocation vector (NAV) configuration field of data transmitted through the first link 331. Specifically, the processor 520 may determine whether the first link 331 is in a physically idle state with reference to the CCA status field, and determine whether the first link 331 is in a logically idle state with reference to the NAV configuration field. As the processor 520 identifies that the first link 331 is in an idle state, the processor 520 may activate a first timer for transmission of the first link 331. The first timer may be a timer to be used for medium synchronization of the first link 331. As the first timer for transmission of the first link 331 expires, the processor 520 may control the communication circuit 510 to transmit data to the external electronic device 320 through the first link 331.

For another example, the processor 520 may select the first link 331 and/or the second link 332 as a link to use for transmitting a packet corresponding to data corresponding to identifying that a service type of data is a first type.

In order to transmit data through the second link 332, the processor 520 may identify whether the second link 332 is in an idle state. The processor 520 may determine whether the second link 332 is in an idle state using information related to the idle state of the second link 332 included in data transmitted through the second link 332. Information related to the idle state of the second link 332 may include a clear channel assessment (CCA) status field and/or a network allocation vector (NAV) configuration field.

The processor 520 may identify whether the second link 332 is in an idle state with reference to the CCA status field and/or the NAV configuration field of data transmitted through the second link 332. Specifically, the processor 520 may determine whether the second link 332 is in a physically idle state with reference to the CCA status field and determine whether the second link 332 is in a logically idle state with reference to the NAV configuration field. As the processor 520 identifies that the second link 332 is in an idle state, the processor 520 may activate a second timer for transmission of the second link 332. As the second timer for transmission of the second link 332 expires, the processor 520 may control the communication circuit 510 to transmit data to the external electronic device 320 through the second link 332.

The processor 520 may perform channel coding on data as part of an operation of generating a packet based on data transmitted by the application processor 120. Channel coding may be performed by the processor 520 in order to increase a success rate of data transmission. The processor 520 may generate encoded data through various channel coding (e.g., turbo coding, polar coding, or low-density parity check code (LDPC)) for data. When performing channel coding, the processor 520 may determine (or change) a data rate and/or a modulation level of the packet. The processor 520 may select a data rate corresponding to the highest expected data throughput, and generate a packet to be transmitted to the external electronic device 320 in a manner of performing channel coding on data based on the selected data rate with reference to mapping data (e.g., Table 1) stored in the memory 530.

The electronic device 310 may not transmit and/or receive data through the second link 332 during a specific time (e.g., the specific time 421 of FIG. 4) due to various reasons. For example, in a situation in which another external electronic device transmits or receives data through the second link 332, the electronic device 310 may identify that the second link 332 is not in an idle state and transmit packets 404, 405, and 406 through the first link 331. During the specific time 421, a state of the second link 332 may be changed, and in the case that the state of the second link 332 is changed, a phenomenon may occur in which reliability of FER information on the second link 332 is lowered. In the case that reliability of FER information is low, when transmitting a packet corresponding to a first type requiring a relatively high transmission rate or relatively low delay time, the electronic device 310 may not select a data rate that reflects the state of the link used for transmitting the packet, and furthermore, a packet transmission rate may decrease and a delay time may increase. In order to increase reliability of FER information included in mapping data, the processor 520 may update mapping data using a packet corresponding to the second type. Hereinafter, a specific embodiment of updating mapping data will be described.

The processor 520 may identify a link transmitted or received packets of the number smaller than a designated value among a plurality of links including the first link 331 and/or the second link 332 corresponding to a request for transmission of a packet corresponding to the first type.

The processor 520 may monitor (or identify) the number of packets transmitted or received through each of the plurality of links and generate (or update) counting data including the number of packets transmitted or received through the plurality of links. The processor 520 may identify the number of packets transmitted or received through a specific link (e.g., the first link 331 and/or the second link 332) during a designated time (or a time window having a designated size) and generate counting data based on the number of transmitted or received packets. The processor 520 may identify by dividing the number of packets transmitted through uplink of a specific link (e.g., the first link 331 and/or the second link 332) and the number of packets received through the downlink channel. Counting data may be implemented, as illustrated in Table 3.

TABLE 3

| Link | Number of packets |
| --- | --- |
| First link 331 | Number of transmitted packets: 78 |
|  | Number of received packets: 107 |
| Second link 332 | Number of transmitted packets: 92 |
|  | Number of received packets: 10 |

The designated value (e.g., 20) may be a value related to reliability of mapping data. FER information corresponding to a link in which the number of transmitted or received packets is less than or equal to a designated value may be inaccurate information.

The processor 520 may identify a link (e.g., the second link 332) in which the number (e.g., 10) of received packets is less than or equal to a designated value (e.g., 20). Alternatively, the processor 520 may identify a link in which the number of transmitted packets is less than or equal to a designated value. Alternatively, the processor 520 may identify a link in which the sum of the number of transmitted packets and the number of received packets is less than or equal to a designated value.

The processor 520 may control a communication circuit 510 to transmit or receive packets corresponding to the second type through a link (e.g., the second link 332) in which the number of transmitted and/or received packets is identified to less than or equal to a designated value. By increasing the number of packets transmitted or received through the identified link by transmitting or receiving packets corresponding to the second type, the processor 520 may generate mapping data including reliable FER information.

In order to transmit or receive packets corresponding to the second type through the identified link, the processor 520 may control the communication circuit 510 to transmit a request message requesting to transmit or receive packets corresponding to the second type through the identified link to the external electronic device 320. The request message may mean an action frame included in a management frame defined in IEEE 802.11. The external electronic device 320 may transmit a response message corresponding to the request message through the identified link.

The processor 520 may control the communication circuit 510 to transmit packets corresponding to the second type through a link (e.g., the second link 332) in which the number of transmitted packets is less than or equal to a designated value. By transmitting packets so that the number of transmissions of packets corresponding to the second type is greater than or equal to a designated value, the processor 520 may generate mapping data including reliable FER information.

The processor 520 may control the communication circuit 510 to receive packets corresponding to the second type through a link (e.g., the second link 332) in which the number of received packets is less than or equal to a designated value. According to an embodiment, the processor 520 may control the communication circuit 510 to transmit a signal requesting transmission of a packet corresponding to the second type to the external electronic device 320 through an identified link (e.g., the second link 332). By receiving packets so that the number of receptions of packets corresponding to the second type is greater than or equal to a designated value, the processor 520 may generate mapping data including reliable FER information.

The processor 520 may enable to transmit or receive a packet corresponding to the second type through the identified link in a manner of modifying link mapping data. The modified link mapping data may be implemented, as illustrated in Table 4. The processor 520 may control the communication circuit 510 to transmit data including the modified link mapping data to the external electronic device 320, and enable the external electronic device 320 to transmit a packet corresponding to the second type through an identified link based on the modified link mapping data.

TABLE 4

| Service Type | Available Links |
| --- | --- |
| First type (e.g., AC_VO, AC_VI) | First link, Second link |
| Second type (e.g., AC_BE, AC_BK) | Second link |

As the processor 520 transmits or receives packets corresponding to the second type through the second link, the processor 520 may update counting data related to the second link. The processor 520 may transmit or receive packets corresponding to the second type through the identified link until the number of packets transmitted or received through a link in which the number of packets transmitted and/or received is identified to less than or equal to a designated value is greater than or equal to a designated value.

The processor 520 may identify the frame error rate (FER) while transmitting or receiving packets corresponding to the second type through the second link. In order to identify a frame error rate, the processor 520 may transmit packets encoded at various data rates through the identified link. The processor 520 may update mapping data based on the identified frame error rate. The electronic device 310 may generate reliable mapping data through the method described above.

The processor 520 may control the communication circuit 510 to transmit or receive packets corresponding to the second type through another link (e.g., the first link) corresponding to identifying a link in which the number of packet transmissions and/or the number of packet receptions is less than or equal to a designated value based on counting data. As the processor 520 transmits or receives packets corresponding to the second type, the processor 520 may update counting data. The processor 520 may transmit or receive packets corresponding to the second type through the identified link until the number of packets transmitted or received through a link in which the number of packets transmitted and/or received is identified to less than or equal to a designated value is greater than or equal to a designated value. The processor 520 may identify a frame error rate (FER) while transmitting or receiving packets corresponding to the second type through another channel. In order to identify the frame error rate, the processor 520 may transmit packets encoded at various data rates through the identified link. The processor 520 may update mapping data based on the identified frame error rate. The electronic device 310 may generate reliable mapping data through the method described above.

The processor 520 may enable to transmit or receive packets corresponding to the second type through at least some links of a plurality of links including another link (e.g., the first link) as well as the identified link corresponding to the number of transmissions and/or receptions of packets corresponding to the second type being greater than or equal to a designated value while transmitting packets corresponding to the second type through a link in which the number of packets transmitted and/or received is identified to less than or equal to a designated value. Alternatively, in the case that transmission and/or reception of the packet corresponding to the first type is completed or that transmission and/or reception of the packet corresponding to the first type do not occur, the processor 520 may enable to transmit or receive packets corresponding to the second type through at least some links of a plurality of links including another link (e.g., the first link) as well as the identified link. The processor 520 may enable to transmit or receive packets corresponding to the second type through another link as well as the identified link in a manner of modifying link mapping data. The modified link mapping data may be implemented, as illustrated in Table 5.

TABLE 5

| Service Type | Available Links |
| --- | --- |
| First type (e.g., AC_VO, AC_VI) | First link, Second link |
| Second type (e.g., AC_BE, AC_BK) | First link, Second link |

The processor 520 may determine a data rate of the packet corresponding to the first type based on the updated mapping data and generate a packet corresponding to the first type using the determined data rate. When transmitting a packet corresponding to the first type, the processor 510 may select (or determine) a link to transmit the packet based on link mapping data. With reference to Table 5, in order to transmit a packet corresponding to the first type, the processor 510 may select the first link 331 and/or the second link 332. The processor 510 may select a link that may be first switched to an idle state among the selected links and transmit a packet corresponding to the first type through the selected link.

Even if the processor 520 transmits or receives a packet corresponding to the second type, the number of transmissions and/or receptions of packets through a link in which the number of transmitted and/or received packets is identified to less than or equal to the designated value may not be (or exceed) greater than or equal to the designated value. In this case, when transmitting a packet corresponding to the first type, the processor 520 may transmit packets while reducing a transmission rate (or data rate) through a link in which the number of transmitted and/or received packets is identified to equal to or less than a designated value. By transmitting packets while reducing the transmission rate, the processor 520 may reduce a delay time due to packet retransmission.

Figure 6:
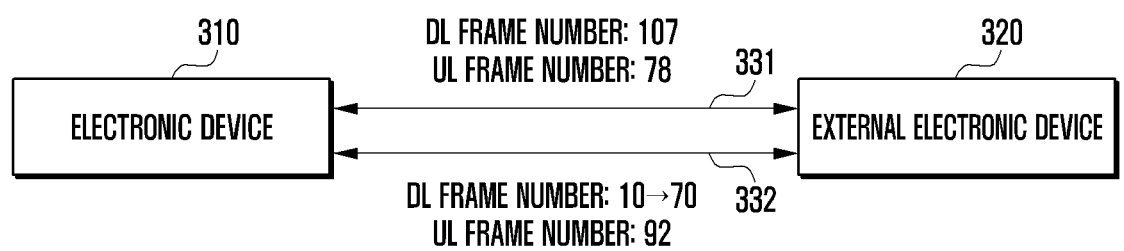
FIG. 6 is a diagram illustrating an embodiment in which an electronic device updates mapping data using a link transmitting packets with the number less than or equal to a designated value according to various embodiments of the disclosure.

FIG. 6 is a diagram illustrating an embodiment in which an electronic device updates mapping data using a link transmitting packets with the number less than or equal to a designated value according to various embodiments of the disclosure.

With reference to FIG. 6, an electronic device (e.g., the electronic device 310 of FIG. 5) may exchange a packet (or data) with an external electronic device (e.g., the external electronic device 320 of FIG. 3) through a first link (e.g., the first link 331 of FIG. 3) and a second link (e.g., the second link 332 of FIG. 3).

According to various embodiments of the disclosure, the electronic device 310 and/or the external electronic device 320 may support a multi-link operation (MLO). The multi-link operation may be an operation mode that transmits or receives data through a plurality of links (e.g., the first link 331 and the second link 332). The multi-link operation is an operation mode scheduled to be introduced in IEEE 802.11be and may be an operation mode that transmits or receives data through a plurality of links based on a plurality of bands or channels.

The electronic device 310 may generate or update counting data including the number of transmitted or received packets while transmitting a packet to the external electronic device 320 through the first link 331 and/or the second link 332 or receiving a packet transmitted from the external electronic device 320. Counting data may be implemented, as illustrated in Table 3.

With reference to counting data, the electronic device 310 may identify a link transmitted or received packets of the number smaller than a designated value among a plurality of links including the first link 331 and/or the second link 332. With reference to FIG. 6, the electronic device 310 may identify the second link 332 that receives packets of the number (e.g., 10) smaller than a designated value (e.g., 20). The electronic device 310 may perform negotiation with the external electronic device 320 so as to receive packets corresponding to the second type from the external electronic device 320 through an identified link (e.g., the second link 332). During the negotiation process, the external electronic device 320 may determine to transmit the packet corresponding to the second type through the second link 332, and transmit the packet corresponding to the second type to the electronic device 310 through the second link 332.

While receiving packets corresponding to the second type through the second link 332, the electronic device 310 may update counting data (modify the number of downlink packets through the second link 332 from 10 to 70). The electronic device 310 may identify a transmission error rate based on packets transmitted and/or received through the first link 331 and/or the second link 332, and update mapping data based on the transmission error rate. The electronic device 310 may determine a data rate of a packet corresponding to the first type based on the updated mapping data and generate a packet corresponding to the first type using the determined data rate. For example, when transmitting a packet corresponding to the first type, the electronic device 310 may select (or determine) a link to transmit the packet based on link mapping data. The electronic device 310 may transmit a packet corresponding to the first type to the external electronic device 320 through the selected link.

An electronic device (e.g., the electronic device 310 of FIG. 5) according to various embodiments of the disclosure may include a communication circuit (e.g., the communication circuit 510 of FIG. 5) configured to transmit or receive data through a plurality of links (e.g., the first link 331 and/or the second link 332 of FIG. 3) generated between an external electronic device (e.g., the external electronic device 320 of FIG. 3) and the electronic device 310, a memory (e.g., memory 530 of FIG. 5) configured to store mapping data in which a data rate and a frame error rate are mapped for a plurality of links 331 and 332, and a processor 520 operatively connected to the communication circuit 510 and the memory 530, wherein the processor 520 may be configured to identify a link transmitted or received packets of the number smaller than a designated value among the plurality of links 331 and 332 corresponding to a request for transmission of a packet corresponding to a first type, to transmit or receive a plurality of packets corresponding to a second type through the identified link, to identify a frame error rate of a plurality of packets corresponding to the second type, and to update the mapping data based on the identified frame error rate.

In the electronic device 310 according to various embodiments of the disclosure, the processor 520 may be configured to determine a data rate of a packet corresponding to the first type based on the mapping data and to generate a packet corresponding to the first type based on the determined data rate.

In the electronic device 310 according to various embodiments of the disclosure, the processor 520 may be configured to identify another link transmitted or received packets of the number smaller than a designated value among the plurality of links 331 and 332, to transmit a plurality of packets corresponding to the second type through the another link, to identify a frame error rate of the plurality of packets corresponding to the second type, and to update the mapping data based on the identified frame error rate.

In the electronic device 310 according to various embodiments of the disclosure, the processor 520 may be configured to identify the number of packets transmitted or received during a designated time through each of the plurality of links 331 and 332 and to store counting data in which each of the plurality of links and the number of identified packets are mapped in the memory 530.

In the electronic device 310 according to various embodiments of the disclosure, the processor 520 may be configured to identify a link in which the transmitted packet is less than or equal to the designated value based on the counting data among the plurality of links 331 and 332 and to transmit a plurality of packets corresponding to the second type through the identified link.

In the electronic device 310 according to various embodiments of the disclosure, the processor 520 may be configured to identify a link in which a received packet is less than or equal to the designated value based on the counting data among the plurality of links 331 and 332 and to receive a plurality of packets corresponding to the second type through the identified link.

In the electronic device 310 according to various embodiments of the disclosure, the processor 520 may be configured to transmit a packet corresponding to the second type through at least some links of the plurality of links 331 and 332 corresponding to completion of transmission of the packet corresponding to the first type.

In the electronic device 310 according to various embodiments of the disclosure, the processor 520 may be configured to select a link to be used for transmitting packets corresponding to the first type among the plurality of links 331 and 332 based on timer information related to duration of an idle state of the plurality of links 331 and 332 and to transmit a packet corresponding to the first type at a transmission rate lower than a transmission rate of the selected link corresponding to the selected link transmitting or receiving packets of the number smaller than the designated value.

In the electronic device 310 according to various embodiments of the disclosure, while transmitting a plurality of packets 331 and 332 corresponding to the second type, the processor 520 may be configured to transmit a plurality of packets corresponding to the second type through the plurality of links 331 and 332 corresponding to identifying that the number of packets transmitted or received through the identified link is equal to or greater than the designated value.

In the electronic device 310 according to various embodiments of the disclosure, before transmitting the packet corresponding to the first type, the processor 520 may be configured to select a link to be first switched to an idle state among the plurality of links and to transmit a packet corresponding to the first type through the selected link.

In the electronic device 310 according to various embodiments of the disclosure, a packet corresponding to the first type may be a packet requiring a higher transmission rate than that of packet corresponding to the second type or a packet requiring a lower delay time than that of a packet corresponding to the second type.

In the electronic device 310 according to various embodiments of the disclosure, the processor 520 may be configured to control the communication circuit 510 to transmit a request message for transmitting or receiving a plurality of packets corresponding to the second type and to update the mapping data based on receiving a response message corresponding to the request message through the identified link.

FIG. 7 is a flowchart illustrating an operation of a method 700 of operating an electronic device according to various embodiments of the disclosure.

In operation 710, the electronic device (e.g., the electronic device 310 of FIG. 5) may detect that transmission of a packet of a first type is required.

Packets may be divided into a plurality of types including a first type and/or a second type according to characteristics of a service in which the packet is used. According to an embodiment, characteristics of the service may include a first type (e.g., voice data type (AC_VO), video data type (AC_VI)) requiring a relatively high transmission rate or low delay rate and/or a second type (e.g., background (AC_BK) and/or best effort (AC_BE)), which is a service type that may be performed at a relatively low transmission rate or high delay rate compared to the first type. A packet corresponding to the first type may be a packet requiring a relatively high transmission rate and/or a relatively low delay time compared to the packet corresponding to the second type.

In operation 720, the electronic device 310 may identify a link transmitting or receiving packets of the number smaller than a designated value among a plurality of links.

The designated value (e.g., 20) may be a value related to reliability of the mapping data. FER information corresponding to a link in which the number of transmitted or received packets is less than or equal to a designated value may be inaccurate information.

The electronic device 310 may identify a link (e.g., the second link 332) in which the number (e.g., 10) of received packets is less than or equal to a designated value (e.g., 20). Alternatively, the electronic device 310 may identify a link in which the number of transmitted packets is less than or equal to a designated value. Alternatively, the electronic device 310 may identify a link in which the sum of the number of transmitted packets and the number of received packets is less than or equal to a designated value.

In operation 730, the electronic device 310 may transmit a plurality of packets corresponding to the second type through a link in which the number of transmitted and/or received packets is identified to less than or equal to a designated value.

The electronic device 310 may control the communication circuit 510 to transmit or receive packets corresponding to the second type through the identified link (e.g., the second link 332). The electronic device 310 may enable to transmit or receive a packet corresponding to the second type through the identified link in a manner of modifying link mapping data. The electronic device 310 may control the communication circuit 510 to transmit data including the modified link mapping data to the external electronic device 320, and the external electronic device 320 may enable to transmit a packet corresponding to a second type through an identified link based on modified link mapping data. By increasing the number of packets transmitted or received through the identified link by transmitting or receiving packets corresponding to the second type, the electronic device 310 may generate mapping data including reliable FER information.

The electronic device 310 may transmit or receive packets corresponding to the second type through an identified link until the number of packets transmitted or received through a link in which the number of packets transmitted and/or received is identified to less than or equal to a designated value is greater than or equal to a designated value.

The electronic device 310 may enable to transmit or receive a packet corresponding to the second type through at least some links of a plurality of links including another link (e.g., the first link) as well as the identified link corresponding to the number of transmissions and/or the number of receptions of packets corresponding to the second type being greater than or equal to a designated value while transmitting packets corresponding to the second type through a link in which the number of transmitted and/or received packets is identified to less than or equal to a designated value. Alternatively, in the case that transmission and/or reception of the packet corresponding to the first type is completed or that transmission and/or reception of the packet corresponding to the first type do not occur, the electronic device 310 may enable to transmit or receive the packet corresponding to the second type through at least some links of a plurality of links including another link (e.g., the first link) as well as a link in which the number of transmitted and/or received packets is identified to less than or equal to a designated value.

In operation 740, the electronic device 310 may identify a frame error rate of a plurality of packets corresponding to the second type.

The electronic device 310 may identify a frame error rate (FER) while transmitting or receiving packets corresponding to the second type. In order to identify the frame error rate, the electronic device 310 may transmit packets encoded at various data rates through an identified link.

In operation 750, the electronic device 310 may update mapping data based on the identified frame error rate.

The electronic device 310 may determine a data rate of a packet corresponding to the first type based on the updated mapping data and generate a packet corresponding to the first type using the determined data rate. Because a data rate may be determined based on reliable mapping data as in the method described above, a transmission success rate of packets corresponding to the first type may increase, and a delay time due to retransmission may also reduce. The electronic device 310 may transmit the generated packet to the external electronic device 320.

A method of operating an electronic device (e.g., the electronic device 310 of FIG. 5) according to various embodiments of the disclosure may include identifying a link transmitted or received packets of the number smaller than a designated value among a plurality of links (e.g., the first link 331 and/or the second link 332 of FIG. 3) generated between the electronic device 310 and an external electronic device (e.g., the external electronic device 320 of FIG. 3) corresponding to a request for transmission of a packet corresponding to a first type, transmitting a plurality of packets corresponding to a second type to the external electronic device 320 through the identified link, identifying a frame error rate of a plurality of packets corresponding to the second type, and updating the mapping data based on the identified frame error rate.

A method of operating the electronic device 310 according to various embodiments of the disclosure may include determining a data rate of a packet corresponding to the first type based on the mapping data and generating a packet corresponding to the first type based on the determined data rate.

A method of operating the electronic device 310 according to various embodiments of the disclosure may further include identifying another link transmitted or received packets of the number smaller than a designated value among the plurality of links 331 and 332, transmitting a plurality of packets corresponding to the second type through the another link, identifying a frame error rate of a plurality of packets corresponding to the second type, and updating the mapping data based on the identified frame error rate.

A method of operating the electronic device 310 according to various embodiments of the disclosure may further include identifying the number of packets transmitted or received during a designated time through each of the plurality of links 331 and 332 and storing counting data in which each of the plurality of links 331 and 332 to the number of identified packets are mapped in a memory 530.

A method of operating the electronic device 310 according to various embodiments of the disclosure may further include identifying a link in which a transmitted packet is less than or equal to the designated value among the plurality of links 331 and 332 based on the counting data and transmitting a plurality of packets corresponding to the second type through the identified link.

A method of operating the electronic device 310 according to various embodiments of the disclosure may further include identifying a link in which a received packet is less than or equal to the designated value among the plurality of links 331 and 332 based on the counting data and receiving a plurality of packets corresponding to the second type through the identified link.

A method of operating the electronic device 310 according to various embodiments of the disclosure may further include transmitting a packet corresponding to the second type through at least some links of the plurality of links corresponding to completion of transmission of the packet corresponding to the first type.

A method of operating the electronic device 310 according to various embodiments of the disclosure may further include selecting a link to be used for transmitting packets corresponding to the first type among the plurality of links 331 and 332 based on timer information related to duration of an idle state of the plurality of links 331 and 332 and transmitting a packet corresponding to the first type at a transmission rate lower than a transmission rate of the selected link corresponding to the selected link transmitting or receiving packets of the number smaller than the designated value.

In a method of operating the electronic device 310 according to various embodiments of the disclosure, a packet corresponding to the first type may be a packet requiring a higher transmission rate than that of a packet corresponding to the second type or a packet requiring a lower delay time than that of a packet corresponding to the second type.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication circuit configured to transmit or receive data through a plurality of links established between an external electronic device and the electronic device;
a memory configured to store mapping data in which a data rate and a frame error rate for the plurality of links are mapped; and
a processor operatively connected to the communication circuit and the memory,
wherein the processor is configured to:
identify a link that has transmitted or received a number of packets smaller than a designated value among the plurality of links in response to a request for transmission of packets of a first type,
transmit or receive a plurality of packets of a second type through the identified link,
identify a frame error rate for the plurality of packets of the second type, and
update the mapping data based on the identified frame error rate.

2. The electronic device of claim 1, wherein the processor is configured to:
determine a data rate of a packet of the first type based on the mapping data, and
generate a packet of the first type based on the determined data rate.

3. The electronic device of claim 1, wherein the processor is configured to:
identify another link that has transmitted or received a number of packets smaller than a designated value among the plurality of links in response to a request for transmission of packets of the first type,
transmit a plurality of packets of the second type through the another link,
identify a frame error rate for the plurality of packets of the second type, and
update the mapping data based on the identified frame error rate.

4. The electronic device of claim 1, wherein the processor is configured to:
identify a number of packets transmitted or received during a designated time through each of the plurality of links, and
store counting data in which each of the plurality of links and the number of the identified packets are mapped in the memory.

5. The electronic device of claim 4, wherein the processor is configured to:
identify a link in which transmitted packets are less than or equal to the designated value based on the counting data among the plurality of links, and
transmit a plurality of packets of the second type through the identified link.

6. The electronic device of claim 4, wherein the processor is configured to:
identify a link in which received packets are less than or equal to the designated value based on the counting data among the plurality of links, and
receive a plurality of packets of the second type through the identified link.

7. The electronic device of claim 1, wherein the processor is configured to transmit a packet of the second type through at least one link of the plurality of links when transmission of a packet of the first type is completed.

8. The electronic device of claim 1, wherein the processor is configured to:
select a link to be used for transmitting a packet of the first type among the plurality of links based on timer information related to duration of an idle state for the plurality of links, and transmit a packet of the first type at a transmission rate lower than a transmission rate of the selected link transmitting or receiving packets of the number smaller than the designated value.

9. The electronic device of claim 1, wherein the processor is configured to transmit a plurality of packets of the second type through the plurality of links in which the number of packets transmitted or received through the identified link is greater than or equal to the designated value while transmitting a plurality of packets of the second type.

10. The electronic device of claim 1, wherein the processor is configured to:
select a link to be first switched to an idle state among the plurality of links before transmitting a packet of the first type, and
transmit a packet of the first type through the selected link.

11. The electronic device of claim 1, wherein a packet of the first type is a packet requiring a higher transmission rate than that of a packet of the second type or a packet requiring a lower delay time than that of the packet of the second type.

12. The electronic device of claim 1, wherein the processor is configured to:
control the communication circuit to transmit a request message for transmitting or receiving a plurality of packets of the second type, and
update the mapping data based on receiving a response message to the request message through the identified link.

13. A method of operating an electronic device, the method comprising:
identifying a link that has transmitted or received a number of packets smaller than a designated value among a plurality of links established between the electronic device and an external electronic device in response to a request for transmission of packets of a first type;
transmitting or receiving a plurality of packets of a second type to or from the external electronic device through the identified link;
identifying a frame error rate for a plurality of packets of the second type; and
updating the mapping data based on the identified frame error rate.

14. The method of claim 13, further comprising:
determining a data rate of a packet of the first type based on the mapping data; and
generating a packet of the first type based on the determined data rate.

15. The method of claim 13, further comprising:
identifying another link that has transmitted or received a number of packets smaller than a designated value among the plurality of links in response to a request for transmission of packets of the first type;
transmitting a plurality of packets of the second type through the another link;
identifying a frame error rate for a plurality of packets of the second type; and
updating the mapping data based on the identified frame error rate.

16. The method of claim 13, further comprising:
identifying a number of packets transmitted or received during a designated time through each of the plurality of links; and
storing counting data in which each of the plurality of links and the number of identified packets are mapped in a memory.

17. The method of claim 16, further comprising:
identifying a link in which transmitted packets are less than or equal to the designated value among the plurality of links based on the counting data; and
transmitting a plurality of packets of the second type through the identified link.

18. The method of claim 16, further comprising:
identifying a link in which received packets are less than or equal to the designated value among the plurality of links based on the counting data; and
receiving a plurality of packets of the second type through the identified link.

19. The method of claim 13, further comprising transmitting a packet of the second type through at least one link of the plurality of links when transmission of a packet of the first type is completed.

20. The method of claim 13, further comprising:
selecting a link to be used for transmitting a packet of the first type among the plurality of links based on timer information related to duration of an idle state for the plurality of links; and
transmitting a packet of the first type at a transmission rate lower than a transmission rate of the selected link transmitting or receiving packets of the number smaller than the designated value.

* * * * *